May 31, 1932.    H. GROB    1,861,180

MEANS FOR REGULATING CIRCUMFERENTIAL VELOCITY

Filed Dec. 8, 1928    2 Sheets-Sheet 1

Patented May 31, 1932

1,861,180

UNITED STATES PATENT OFFICE

HUGO GROB, OF BERLIN, GERMANY

MEANS FOR REGULATING CIRCUMFERENTIAL VELOCITY

Application filed December 8, 1928, Serial No. 324,767, and in Germany December 14, 1927.

The present invention relates to a means for regulating circumferential velocities.

For certain purposes, for example in wireless telegraphy, the transmission of signals to moving trains, etc., it is essential to exactly maintain the number of revolutions of an electric generator.

It has hitherto been usual to regulate the number of revolutions mechanically. With this method of regulation, however, certain obstructive forces occur resulting from friction and inertia.

The present invention relates to a means for regulating the number of revolutions, in which the forces in question do not occur, or at least merely to a very reduced extent. A feature of the invention resides in employing not the number of revolutions to be regulated as the source of actuation for the regulating operation, but a voltage which is dependent thereon, and furthermore in not allowing the regulating device controlled by this voltage to act in direct manner on the control means for supplying energy to the operating part, but to influence by means of the same an auxiliary electric current, which in turn regulates in direct fashion the number of revolutions to be maintained at a constant level. In this manner the use of regulating means is rendered possible which, at least theoretically, are capable of maintaining exactly constant mathematically the voltage to be regulated (and accordingly the number of revolutions to be regulated), as is possible by the use of electric regulators. As well known, mechanical regulators require to allow a certain variation in the value to be regulated in order to obtain the force necessary for the adjustment of the regulating mechanism.

An additional feature of the invention consists in exciting, by means of the auxiliary current controlled by the regulating device, a magnetic circuit, which by the induction of electric currents between two members moved relatively to each other creates mechanical forces acting upon the number of revolutions to be regulated. In this manner a regulating force acting in an operating or breaking sense may be produced, the generation of which does not lead to mechanical wear.

Figure 1:
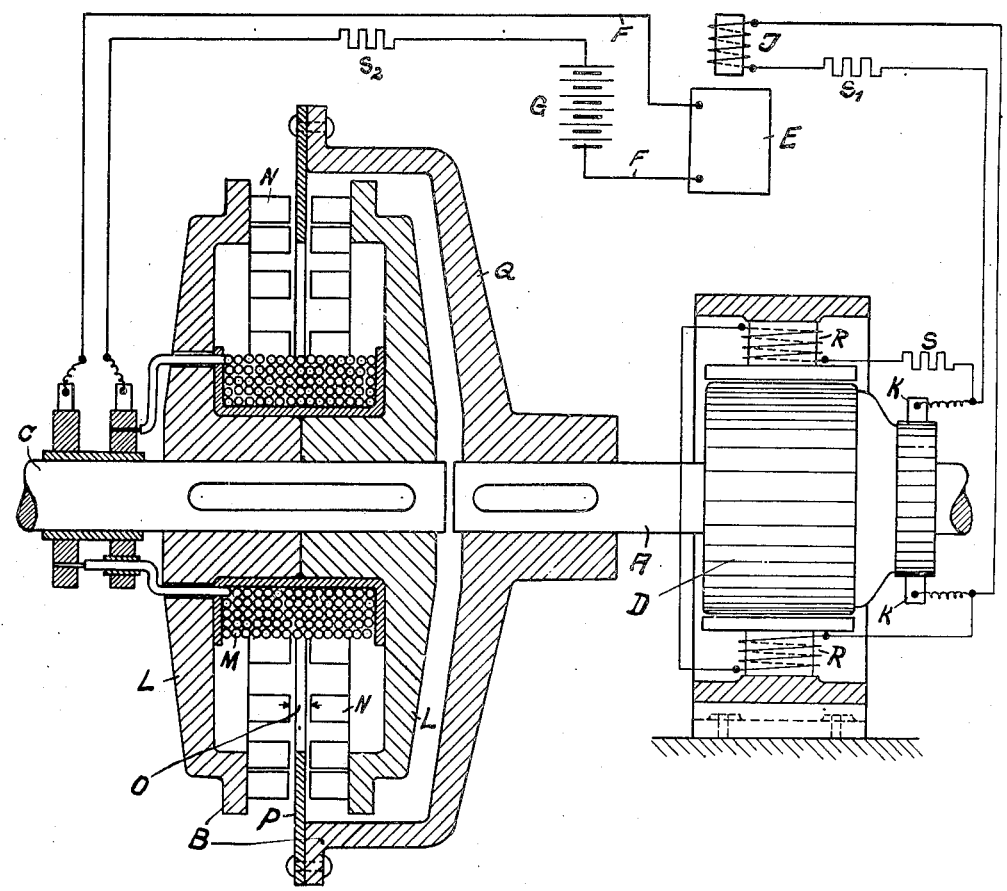

The invention will now be described more fully with reference to the accompanying drawings, in which Fig. 1 shows diagrammatically one possible form of embodiment by way of example, Fig. 2 being a modification.

In the example according to Fig. 1 the magnetic circuit referred to belongs to an eddy current coupling, in which the auxiliary current, independently of the circumferential velocity of the driven shaft, always generates an operative force of such strength that, upon each loading of the driven shaft, the number of revolutions thereof remain exactly constant.

In Fig. 1, A represents the end of the shaft, the revolutions of which are to be regulated. The same is operated through the medium of the eddy current coupling B by the shaft C transmitting the rotary motion. The electric voltage controlling the regulating operation and dependent on the useful number of revolutions is generated by the small dynamo D mounted on the shaft A, and the influence exerted on the auxiliary electric current, with which the regulating operation is to be controlled, occurs through the medium of the voltage regulator E. The latter in the known manner varies the resistance in the circuit F F, in which a flow of current is maintained by a suitable current source G. The regulator E is controlled by the force of the magnet J. The operation of all voltage regulators of this type is based inter alia on the fact that the same varies the resistance of the circuit F F immediately the exicting voltage does not possess the correct value at its control magnet J, and that the variation in resistance produced causes in turn, in direct fashion, variation in the exciting voltage at the magnet J, in such manner that deviation thereof from the desired value is reduced or eliminated entirely.

In the present example the current controlled in the circuit F F by the regulator E is employed for varying the slip of the eddy current coupling C. Firmly keyed on the operating shaft C are two discs L composed of iron or steel castings, between which discs is situated an exciting magnet coil M, and which each carry at their edge a number of iron studs N or radially disposed ribs, which are situated opposite to each other at a certain distance apart. In the space intermediate of the two series of studs there projects or is received a copper ring P, which is secured to a support Q mounted on the shaft to be driven.

The coupling magnet coil M is connected across the circuit FF controlled by the regulator E. The greater the amount of current allowed by the regulator to result in the circuit FF, the greater will be the operative force of the coupling due to the eddy currents resulting in the copper ring P, and the lesser will be the extent to which the driven shaft A remains in its number of revolutions behind those of the driving shaft C. The voltage exciting the regulating magnet J is supplied by the generator brushes K.

The total regulating operation now occurs in the following manner:

The driving shaft C possesses a number of revolutions, which may vary as desired, but which must always excite at least to a certain extent those of the driven shaft A, which are to be maintained at a constant level. It will be assumed that the latter number of revolutions is at a certain moment too high. In this case the voltage at the generator brushes K and accordingly that at the regulating magnet J is also too high. As a result of this excessive value the regulator E increases the resistance in the circuit FF and thus reduces the magnetic excitation of the coupling B, whereby the operative force thereof is decreased and the number of revolutions of the shaft A are diminished. This operation continues for such time until due to the decreased velocity the voltage at the brushes K, or at the regulating magnet J respectively, has been reduced to the desired amount. In this manner it is possible theoretically to maintain exactly constant mathematically the number of the revolutions of the shaft A under each load and with each excess velocity of the shaft C. A condition for this resides merely in exact operation of the regulator E, which operation, as well known, may be readily accomplished assuming a distinctive connection exists between the number of revolutions of the generator and the voltage.

The small dynamo D is preferably arranged for self-excitation, in order to convert as far as possible fluctuations in the circumferential velocity into fluctuations in voltage. For reducing disturbing thermal action on the exciter coil R a constant series resistance is preferably included in the exciter circuit, also with the object of diminishing danger of swing resulting by the self-inductive delay in current variation in the exciter coils. For the same purposes constant resistances S1 and S2 free from self-induction are preferably also connected across the circuits of the regulating magnet coil and the coupling coil.

For the purpose of diminishing disturbing influence of the remnant magnetism, or the coercive of the magnetic circuit of the generator respectively, which upon increased or reduced excitation destroys distinctiveness in the connection between circumferential velocity and the voltage excited, it is preferable to employ for the stationary parts of the magnetic circuit the iron alloy usual in transformer construction, the hysteresis curve of which alloy is, as well known, considerably narrower than that of ordinary iron.

The circuit F F controlled by the regulator E may, in such cases in which the operating motor also serves for the operation of a lighting current generator, be supplied with current from this source in place of the accumulator G shown in the drawings. It is not necessary to maintain the same constant for the purpose of attaining exact regulation of the number of revolutions.

Figure 2:
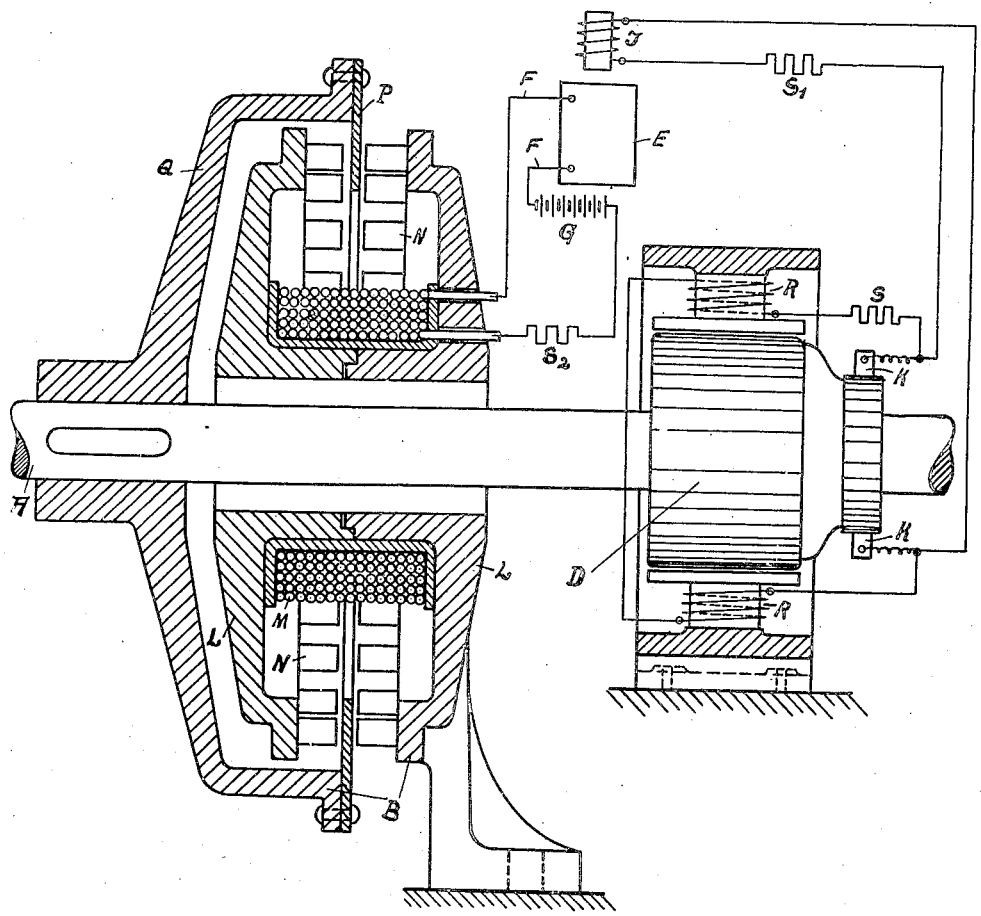

In the embodiment according to Fig. 2 the auxiliary current excites an eddy current brake which brakes the shaft to be regulated down to the correct number of revolutions. In this case A represents the shaft, the number of revolutions of which are to be regulated, and which in this embodiment is coupled with the operating motor, the number of revolutions of which varies to a certain extent. The motor may for example consist of a steam turbine, or may also be an electro-motor or the like.

As in the case of the embodiment according to Fig. 1, the auxiliary voltage dependent on the number of revolutions is generated by a small dynamo D, the voltage of which taken over by the brushes K acts on the voltage regulator E through the medium of the electro-magnet J. This causes more or less resistance to result in the circuit F F in such manner that the current generated by the source G becomes all the smaller the less is the voltage which is effective at the magnet J.

The auxiliary current traversing the circuit F F and regulated by the regulator E excites the magnet coil M of an eddy current brake B. The stationary magnetic circuit is formed by two discs L, which possess at their peripheries oppositely situated abutments N, and between which rotates a motor disc P connected to the shaft A through the medium of the support Q.

The operation in this case is as follows:

Exactly as in the case of the embodiment according to Fig. 1 the regulator J E always varies the resistance in the circuit F F to such value that the correct value is assumed by the voltage effective at the magnet coil J.

If for example this voltage, or the number of revolutions of the shaft A respectively, are too high, the resistance in the circuit F F decreases, and the excitation of the eddy current brake B increases. In this manner the braking effect resulting at the motor ring P is amplified, and the number of revolutions of the shaft E fall to such extent until the voltage at the regulating magnet J, or the number of revolutions of the shaft E respectively, again assume the correct amount, immaterial how large or how small the resistance in the circuit F F may be necessary for this purpose.

The resistances S, S1 and S2 referred to in the first embodiment may also be employed with advantage, also alloyed magnetic material in the magnetic circuit of the dynamo D.

Furthermore, the source of current G shown here as a battery may also be substituted by the lighting network voltage produced by a generator simultaneously driven by the operating motor.

It will be understood that the invention is not restricted to the exact forms of embodiment shown, but that various modifications may be made without departing from the spirit of the invention.

What I claim as new and desire to secure by Letters Patent is:

1. A means for regulating circumferential velocity, comprising in combination a shaft, the member of revolutions of which are to be maintained at a constant level, a voltage generator driven by the said shaft, a voltage regulator by which an exciting magnet coil is connected with the said voltage generator and which automatically varies an electrical resistance for such time until the effective voltage at the said exciting magnet coil has assumed the correct value, a circuit having a voltage source and including both the said resistance controlled by the voltage regulator as well as a magnet coil, a member forming a magnetic circuit which is excited by the said magnet coil and a member coacting with said magnetic circuit member and in which electric currents are induced by a relative rotary action therebetween, and a coupling member which couples the one of the two members of the magnetic circuit executing the relative rotary action with the shaft the number of revolutions of which are to be maintained constant.

2. A means for regulating circumferential velocity, comprising in combination a shaft, the number of revolutions of which are to be maintained at a constant level, a voltage generator driven by the said shaft, a voltage regulator by which an exciting magnet coil is connected with the said voltage generator and which automatically varies an electrical resistance for such time until the effective voltage at the said exciting magnet coil has assumed the correct value, a circuit having a voltage source and including both the said resistance controlled by the voltage regulator as well as a magnet coil, an eddy current coupling which is excited by the said magnet coil, and a coupling member which couples the one part of the said eddy current coupling with the shaft the number of revolutions of which are to be regulated.

3. A means for regulating circumferential velocity, comprising in combination a shaft, the number of revolutions of which are to be maintained at a constant level, a voltage generator driven by the said shaft, a voltage regulator by which an exciting magnet coil is connected with the said voltage generator and which automatically varies an electrical resistance for such time until the effective voltage at the said exciting magnet coil has assumed the correct value, a circuit having a voltage source and including both the said resistance controlled by the voltage regulator as well as a magnet coil, an eddy current brake which is excited by the said magnet coil, and a coupling member which couples the movable part of the said eddy current brake with the shaft, the number of revolutions of which are to be regulated.

4. A means for regulating circumferential velocity, comprising in combination a shaft, the number of revolutions of which are to be maintained at a constant level, a voltage generator which is driven by the said shaft and having a magnetic circuit which consists of alloyed magnetic metal having as small a coercive force as possible, a voltage regulator by which an exciting magnet coil is connected with the said voltage generator and which automatically varies an electrical resistance for such time until the effective voltage at the said exciting magnet coil has assumed the correct value, a circuit having a voltage source and including both the said resistance controlled by the voltage regulator as well as a magnet coil, a member forming a magnetic circuit which is excited by the said magnet coil and a member coacting with said magnet circuit member and in which electric currents are induced by a relative rotary motion therebetween, and a coupling member which couples the one of the two members of the magnetic circuit executing the relative rotary motion with the shaft the number of revolutions of which are to be maintained constant.

5. A means for regulating circumferential velocity, comprising in combination a shaft, the number of revolutions of which are to be maintained at a constant level, a voltage generator which is driven by the said shaft, and in the exciter coils and armature circuit of which are included ohmic resistances having a constant temperature coefficient, a voltage regulator by which an exciting magnet coil is connected with the said voltage generator and which automatically varies an electrical resistance for such time until the effective voltage at the said exciting magnet coil has assumed the correct value, a circuit having a voltage source and including both the said resistance controlled by the voltage regulator as well as a magnet coil, a member forming a magnetic circuit which is excited by the said magnet coil and a member coacting with said magnetic circuit member and in which electric currents are induced by a relative rotary action therebetween, and a coupling member which couples the one of the two members of the magnetic circuit executing the relative rotary motion with the shaft the number of revolutions of which are to be maintained constant.

6. In apparatus of the character described, in combination, a shaft, the speed of which is to be maintained substantially constant; a driving shaft; means coupling said two shafts comprising means mounted upon one of them and rotatable therewith and providing a magnetic circuit, and a member mounted upon and rotatable with the other of said shafts and positioned to be acted upon by the magnetic field in said magnetic circuit and to have electric currents induced therein upon relative rotary motion between said two members; a coil for energizing said magnetic circuit member; a generator driven by said first-mentioned shaft and adapted to have a function of its output vary with the speed of said first-mentioned shaft; a source of current for energizing said coil; and means responsive to variations in a function of the output of said generator for decreasing the excitation of said coil upon increases in the speed of said first-mentioned shaft and for increasing the excitation of said coil upon decreases in the speed of said first-mentioned shaft.

7. In apparatus of the character described, in combination, a shaft, the speed of which is to be maintained substantially constant; a driving shaft; means coupling said two shafts comprising means mounted upon one of them and rotatable therewith and providing a magnetic circuit, and a member mounted upon and rotatable with the other of said shafts and positioned to be acted upon by the magnetic field in said magnetic circuit and to have electric currents induced therein upon relative rotary motion between said two members; a coil for energizing said magnetic circuit member; and means responsive to changes in the speed of said first-mentioned shaft for varying the excitation of said coil.

8. In apparatus of the character described, in combination, a rotatable driven member, the speed of change of which is to be maintained substantially constant; a rotatable driving member; means coupling said two members comprising electromagnetic means rotatable with one of said members and providing a magnetic field, and means rotatable with the other of said members and positioned within the influence of said magnetic field and to have electric currents induced therein upon relative rotary motion therebetween; and means responsive to changes in the speed of said driven member for varying the strength of the magnetic field produced by said electromagnetic means.

9. In apparatus of the character described, in combination, a rotatable driven member, the speed of change of which is to be maintained substantially constant; a rotatable driving member; means coupling said two members comprising means rotatable with one of said members and providing a magnetic field, and means rotatable with the other of said members and positioned within the influence of said magnetic field and to have electric currents induced therein upon relatively rotary motion therebetween; and means responsive to changes in the speed of said driven shaft for changing the electromagnetic interaction between said two means.

In testimony whereof I have affixed my signature.

HUGO GROB.